United States Patent
Palacci et al.

(10) Patent No.: US 9,821,294 B2
(45) Date of Patent: Nov. 21, 2017

(54) SELF ASSEMBLED PARTICLES

(71) Applicant: New York University, New York, NY (US)

(72) Inventors: Jeremie Palacci, New York, NY (US);
Stefano Sacanna, Brooklyn, NY (US);
David J. Pine, New York, NY (US);
Paul Michael Chaikin, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 14/759,910

(22) PCT Filed: Jan. 8, 2014

(86) PCT No.: PCT/US2014/010703
§ 371 (c)(1),
(2) Date: Jul. 8, 2015

(87) PCT Pub. No.: WO2014/110148
PCT Pub. Date: Jul. 17, 2014

(65) Prior Publication Data
US 2015/0352526 A1 Dec. 10, 2015

Related U.S. Application Data

(60) Provisional application No. 61/750,688, filed on Jan. 9, 2013.

(51) Int. Cl.
*B01J 23/00* (2006.01)
*B01J 23/745* (2006.01)
(Continued)

(52) U.S. Cl.
CPC ........... *B01J 23/745* (2013.01); *B01J 35/004* (2013.01); *B01J 35/0013* (2013.01);
(Continued)

(58) Field of Classification Search
None
See application file for complete search history.

(56) References Cited

U.S. PATENT DOCUMENTS

| | | | |
|---|---|---|---|
| 4,001,100 A * | 1/1977 | Haydock | B01D 57/02 204/202 |
| 2010/0252507 A1 * | 10/2010 | Lacharme | B03C 1/288 210/695 |
| 2012/0080878 A1 * | 4/2012 | Kecht | B41M 3/14 283/85 |

OTHER PUBLICATIONS

International Search Report and Written Opinion for Application No. PCT/US2014/010703, dated Apr. 29, 2014, 7 pages.
(Continued)

*Primary Examiner* — Melvin C Mayes
*Assistant Examiner* — Stefanie Cohen
(74) *Attorney, Agent, or Firm* — Foley & Lardner LLP

(57) ABSTRACT

A self-assembling structure using non-equilibrium driving forces leading to "living crystals" and other maniputable particles with a complex dynamics. The dynamic self-assembly assembly results from a competition between self-propulsion of particles and an attractive interaction between the particles. As a result of non-equilibrium driving forces, the crystals form, grow, collide, anneal, repair themselves and spontaneously self-destruct, thereby enabling reconfiguration and assembly to achieve a desired property.

18 Claims, 12 Drawing Sheets

(51) Int. Cl.
*B01J 35/00* (2006.01)
*C01G 49/06* (2006.01)

(52) U.S. Cl.
CPC .......... *B01J 35/0033* (2013.01); *C01G 49/06* (2013.01); *C01P 2004/38* (2013.01); *C01P 2006/42* (2013.01)

(56) References Cited

OTHER PUBLICATIONS

Stefano Sacanna et al. Magnetic Click Colloidal Assembly. J. Am. Chem. Soc., 2012, vol. 134, Issue 14 (April), pp. 6112-6115, Publication Date (Web): Mar. 27, 2012, 4 pages.
Paul Chaikin, "Living Crystals from Light Activated Artificial Surfers" International Workshop Pioneers in Soft Matter Science (Program), Jun. 18-20, 2012, [online] [retrieved on Nov. 4, 2014] Retrieved from Internet: URL:http:llsoftmatt.files.wordpress.com/2012/03/abstract_pioneers-in-soft-matterscience.pdf; pp. 8.

* cited by examiner

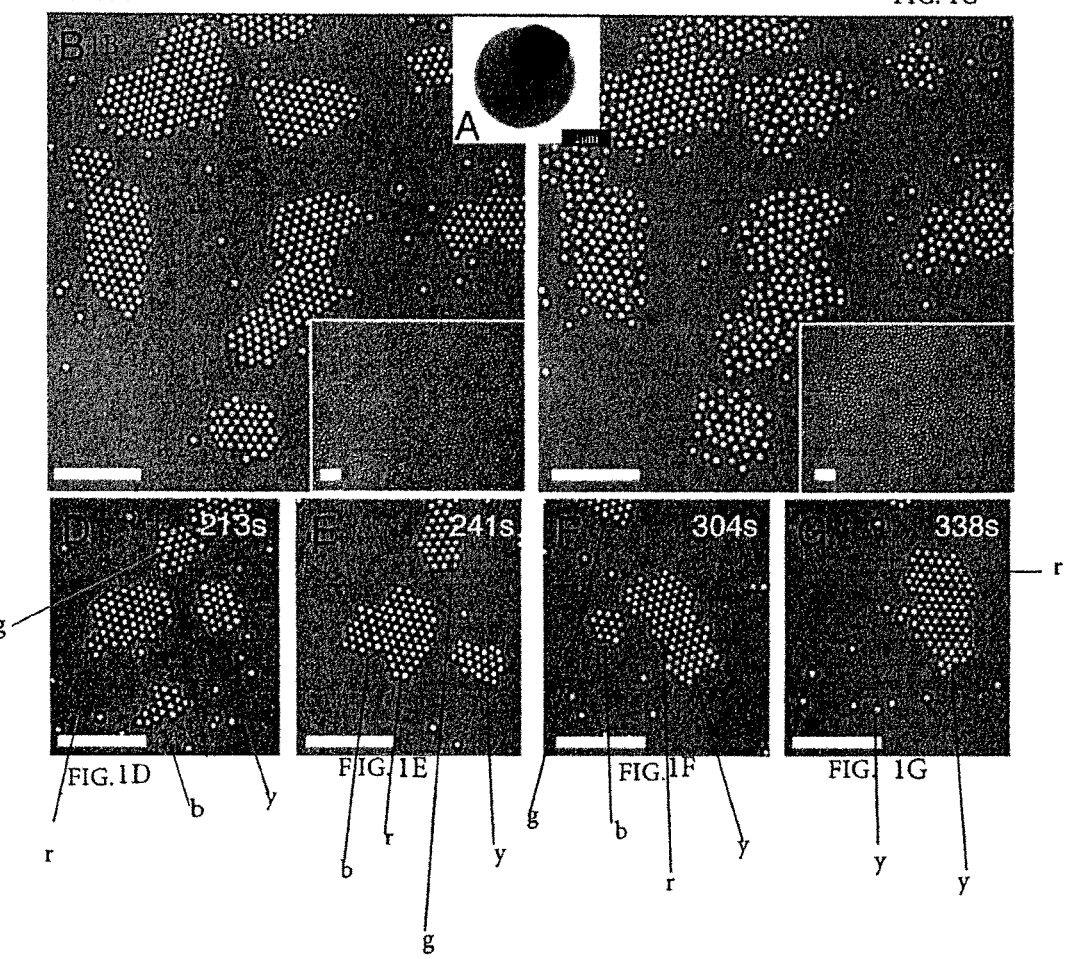

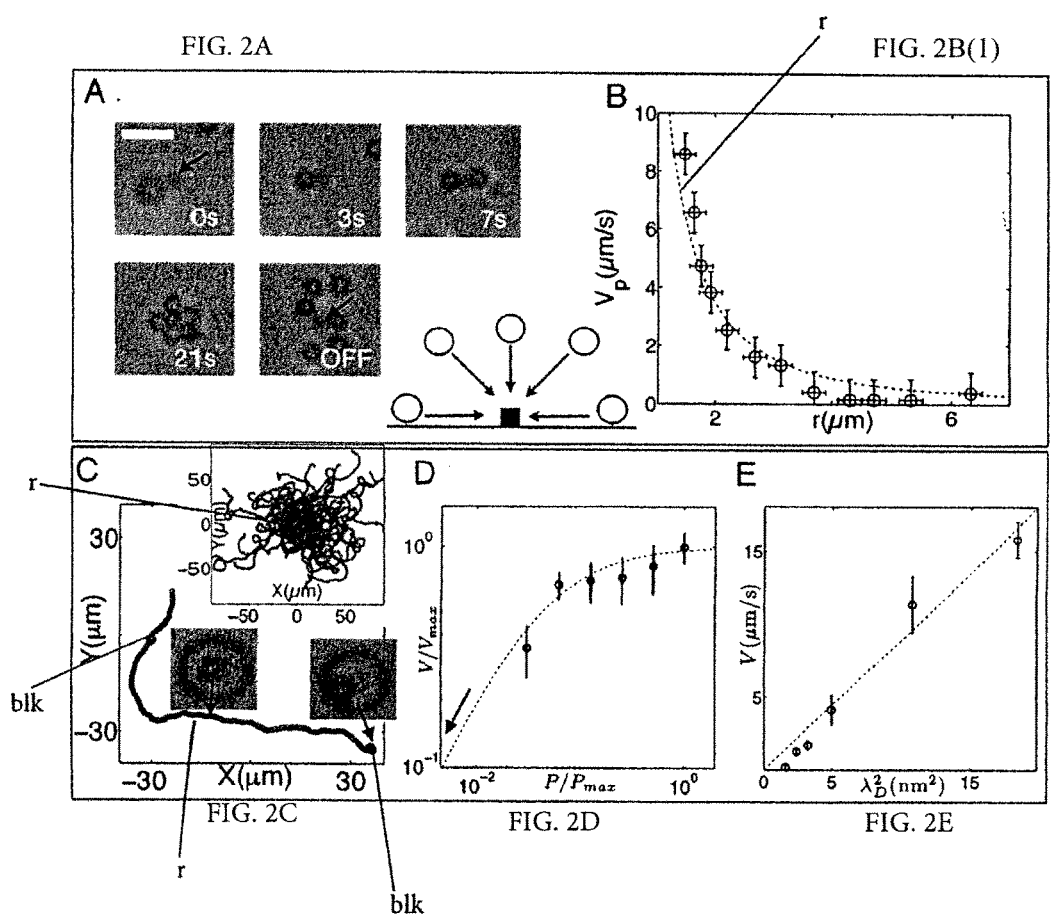

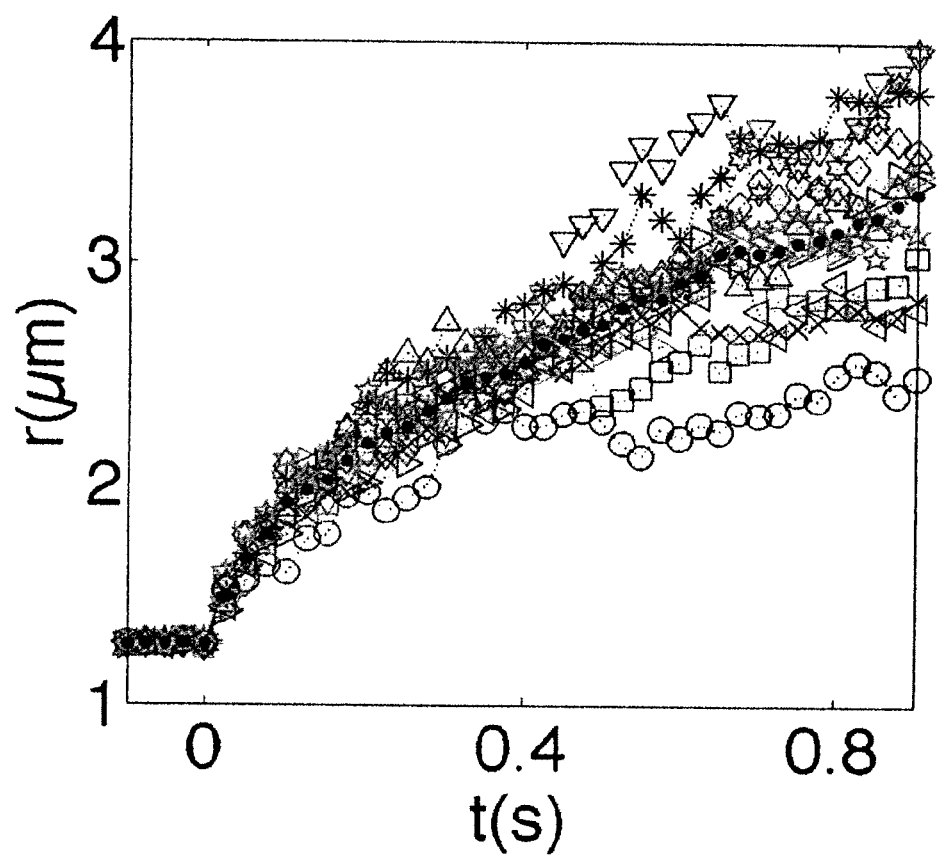
FIG. 2B(2)

FIG. 3A
FIG. 3B
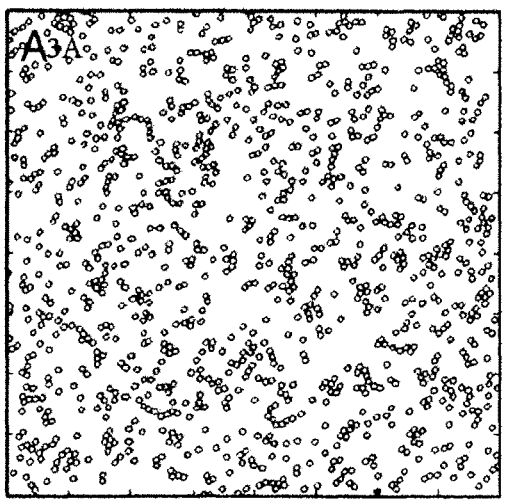
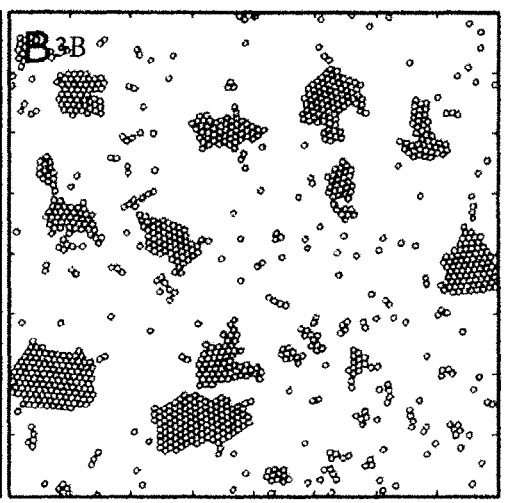
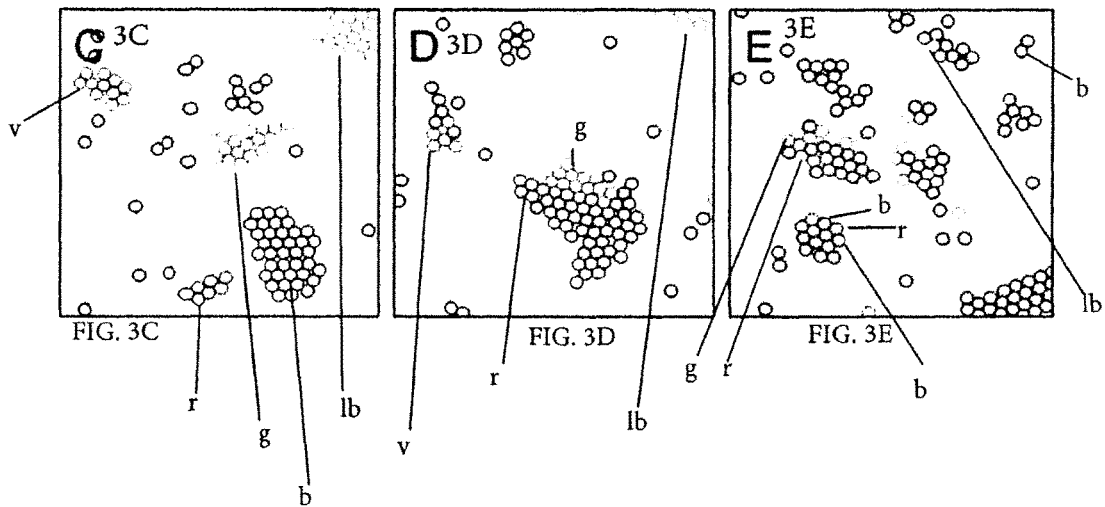
FIGS. 3A-3E

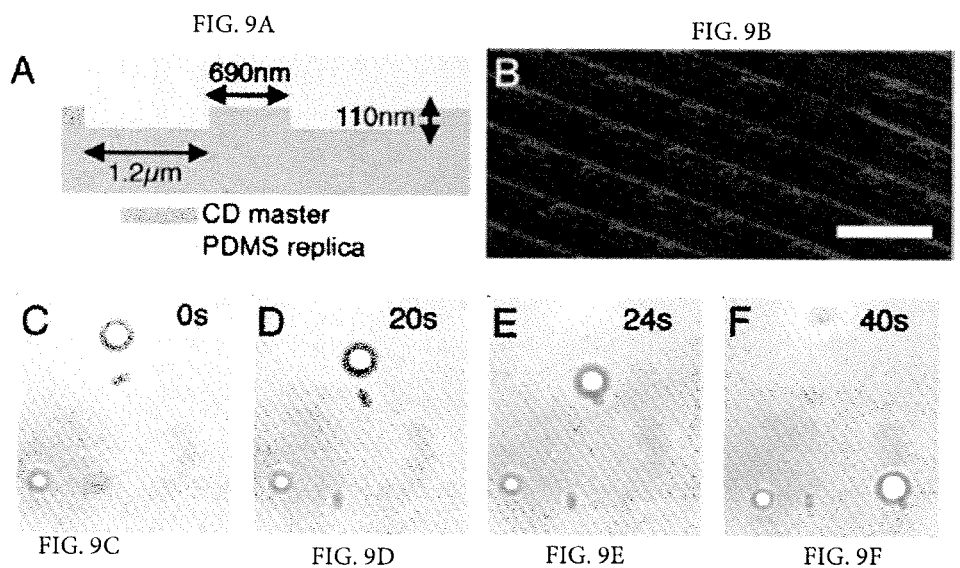

US 9,821,294 B2

SELF ASSEMBLED PARTICLES

CROSS-REFERENCE TO RELATED PATENT APPLICATIONS

This application is a 371 National Stage of PCT Patent Application No. PCT/US2014/010703, filed Jan. 8, 2014, which claims the benefit of U.S. Application No. 61/750,688, filed Jan. 9, 2013, the contents of which are incorporated herein by reference in its entirety.

STATEMENT OF GOVERNMENT INTEREST

The United States Government has rights in the invention described herein pursuant to MRSEC Program of the National Science Foundation under Award Number DMR-0820341 and the Muri W911NF-10-1-0518 and from the NASA under Grant Award NNX08AK04G.

FIELD OF THE INVENTION

The present invention generally relates to self-assembled structures. Specifically, certain embodiments relate to living crystals of light activated colloidal surfers.

BACKGROUND OF THE INVENTION

Self-organization is a common feature among living matter. Spontaneous formation of colonies of bacteria or flocks of birds are example of self-organization in active living matter. Self-organization often develops in thermal equilibrium as a consequence of entropy and potential interactions. However, there is a growing number of phenomena where order arises in driven, dissipative systems, far from equilibrium. Examples include "random organization" of sheared colloidal suspensions and rods, nematic order from giant number fluctuations in vibrated rods and phase separation from self-induced diffusion gradients. It also motivates great interest in biological and artificial active particles, and in the swarm patterns that result from their interactions.

SUMMARY OF THE INVENTION

One embodiment of the invention relates to a composition of matter comprising a plurality of active particles. The composition further includes a medium in which the plurality of active particles are disposed, the plurality of active particles propellable within the medium. The plurality of active particles have an attractive force therebetween.

In one embodiment, the invention relates to a method for particle self assembly. The method comprises propelling a plurality of particles in a medium. Two or more particles of the plurality of particles are collided. A living crystal structure is formed comprising collided particles.

In one embodiment, the invention relates to a method of controlling structure formation comprising applying a non-equilibrium driving force to a plurality of particles. Attractive interaction is introduced between each of the plurality of particles. A structure is formed comprising the plurality of particles.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 1A-G. FIG. 1A is a SEM of the bimaterial colloid: a TPM polymer colloidal sphere with protruding hematite cube (dark). FIG. 1B is a Living crystals assembled from a homogeneous distribution (inset) under illumination by blue light. FIG. 1C is a Living crystals melt by thermal diffusion when light is extinguished: image shows system 10 s after blue light is turned off (inset, after 100 s). In FIGS. 1D-G the various labelled false colors "r", "b", "g" and "y" show the time evolution of particles belonging to different clusters. The clusters are not static but rearrange, exchange particles, merge (FIGS. 1D-F), break apart (FIGS. 1E-F) or become unstable and explode (blue cluster, FIGS. 1F-G). For FIGS. 1B-G, the scale bar is 10 μm. The solid area fraction is $\Phi_s \approx 0.14$;

FIGS. 2A-E illustrate out-of-equilibrium driving forces; FIG. 2A illustrates a hematite cube, indicated by an arrow, is immobilized on a surface and immersed in a solution of colloidal tracers; at t=0 s, the blue light is switched on triggering the decomposition of hydrogen peroxide on the hematite surface; the tracers are attracted to the hematite until they contact the cube; the attraction is isotropic with particles coming from all directions, thus discounting adjective flow which must exhibit zero divergence; when the light is turned off, the attraction ceases and the tracers diffuse away. FIGS. 2B(1) and 2B(2) illustrate the attraction quantified by the radial velocity $V_p$ extracted from the ensemble average of the tracer drift (inset, black symbols with the various trajectories shown about the black data average) and is consistent with the $r^{-2}$ behavior ("red" or "r" dashed line) expected for phoretic attraction to a reaction source; FIG. 2C illustrates a hematite cube protruding from a TPM polymer sphere moves on fixed glass substrate when exposed to blue light (red or "r" part of trace) and diffuses when the light is off ("black" two dots part of trace). Initially, with no light, the hematite cube is oriented randomly (image, right), but rotates and faces downward towards the glass substrate when the light is turned on (image, left); the particle then surfs on the osmotic flow it induces between the substrate and itself; the inset shows a superposition of the trajectories of many particles with their origins aligned; FIG. 2D illustrates the particle velocity V increasing with light intensity P and follows Michaelis-Menten law (dashed line). The black arrow indicates the point of zero velocity for P=0. (E) The particle velocity is also strongly dependent on the Debye length $\lambda_D$ of the system and asymptotically follows the $V \propto \lambda D^2$ scaling expected for osmotic mechanisms (dashed line). The Debye length is varied adding NaCl to the buffer solution except for the blue symbol for which the SDS surfactant is suppressed to reach higher $\lambda_D$. The error bars in FIG. 2D and FIG. 2E are given by the standard deviation of the velocity measured for 10 to 20 different particles;

FIGS. 3A-E illustrate numerical simulations of self-propelled disks coupled by a phoretic attraction. Simulation parameters are defined to mimic the experimental conditions In FIG. 3A, the starting homogeneous distribution is illustrated. In FIG. 3B ($\sim t=8 \sim r_r$) the disks assemble in mobile crystalline clusters with faceted edges. In FIG. 3C-E the false colors noted by "r", "b", "g", "lb" and "v" show the time evolution of particles belonging to different clusters. The crystals are mobile (FIGS. 3C-E), can merge (FIGS. 3C-D), and break apart or dissolve (FIGS. 3D-E). This minimal model reproduces the experimental dynamics of the "living crystals" and demonstrates the relevance of the proposed mechanism. The parameters consistent were with the experimental conditions of FIGS. 1A-G: $\Phi_s=$ 0:14, ~$r_r$=16 and A~=0:87;

FIGS. 4D and 4E illustrate where the magnetic field is turned on and the light is on, the crystal is self-propelled in the direction of the magnetic field, crystal breakup is suppressed. FIG. 4F illustrates where the light is turned off and the magnetic field $B_0$ is left, the crystal dissolves. FIG. 4G illustrates where the magnetic field is turned off and the light is turned on, particles collide and the crystal reforms. FIG. 4H illustrates where the light is turned off and the magnetic field remains off, the crystal dissolves. FIG. 4I illustrates where the magnetic field is turned on first and then the light is turned on, the particles all move in the field direction, they do not collide and do not crystallize;

FIG. 6A illustrates number fluctuations measured in the simulations without attraction for varying surface fraction $\Phi_s$, in the range 1-70%. N=600 and the particles parameters are consistent with the experimental conditions: $\tau_r$=16 and Ã=0. The number fluctuations curve are offset to enhance the readability. FIG. 6B illustrates scaling of the Number fluctuations, $\Delta N \alpha N^\alpha$, for various surface coverage $\Phi$ in these simulations. A smooth increase of a and no anomalous fluctuation of numbers for concentration $\Phi_s \leq 20\%$ are observed. Error bars are given by the standard deviation in the determination of α from fit at different instants;

FIG. 8A shows a trajectory of a hematite particle steered (dashed line) using an external magnetic field to pick up a 5 pm colloidal cargo together with its trajectory after docking (solid line), the upper left small trace shows the Brownian diffusion of a control colloid; FIG. 8B shows dependence of the velocity V on the diameter d of the cargo. FIGS. 8C-8K show time lapse of the colloidal cargo experiment; the hematite particle position is indicated by points labelled "r"; FIGS. 8C-8D show At t=0 s, the hematite particle is activated by light. At t=6 s, an external magnetic field is applied to steer the hematite particle toward a 5 pm colloid, the cargo; the hematite particle moves along the direction of the magnetic field. FIGS. 8E-8F and FIGS. 8H-8I show the hematite particle docks on the colloid and tows it, with the hematite peanut leading; the direction is fixed externally by the magnetic field. FIGS. 8F-8G and FIGS. 8I-8J show changing the direction of the magnetic field steers the hematite peanut, quickly redirecting the cargo; FIGS. 8J-9K show the light is switched off, the phoretic attraction ceases, and the colloidal cargo is released; the hematite peanut and cargo resume Brownian diffusion; and FIG. 9A shows a textured PDMS substrate of parallel lines made using a CD master; FIG. 9B shows an SEM micrograph of the PDMS replica; the scale bar is 2 μm; FIG. 9C shows the hematite and large-cargo colloids sediment near the substrate pattern and undergo Brownian diffusion; FIG. 9D shows when illuminated, the hematite is attracted to the substrate and aligns with the texture; FIGS. 9E-9F show the colloid cargo is attracted to the hematite and docks; the composite hematite and colloid cargo then start moving, with the hematite in front and following the tracks imprinted in the substrate; no external field is applied to steer the particles.

DETAILED DESCRIPTION OF THE PREFERRED EMBODIMENTS

Figure 4A:
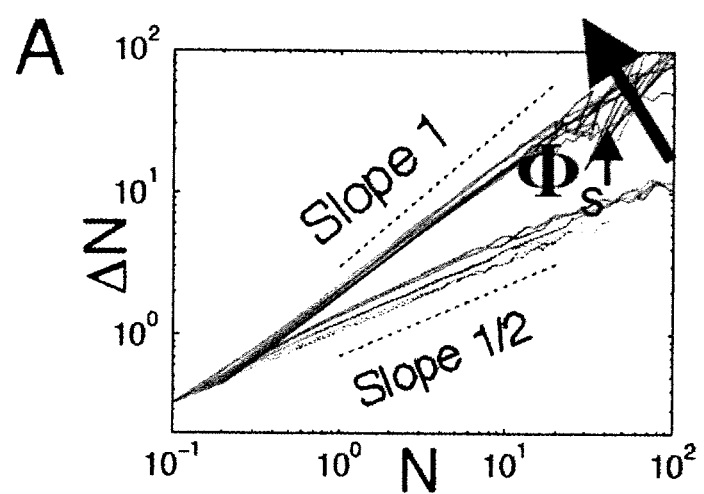
FIG. 4A illustrates number fluctuations measured in the simulations for varying surface fraction $\Phi_s$, in the range 1-15% for N=600 particles (~$r_r$=16 and A~=0:87 from the experiment). The system exhibits a transition from normal to giant fluctuations for $\Phi$C s~7%.
Figure 4C:
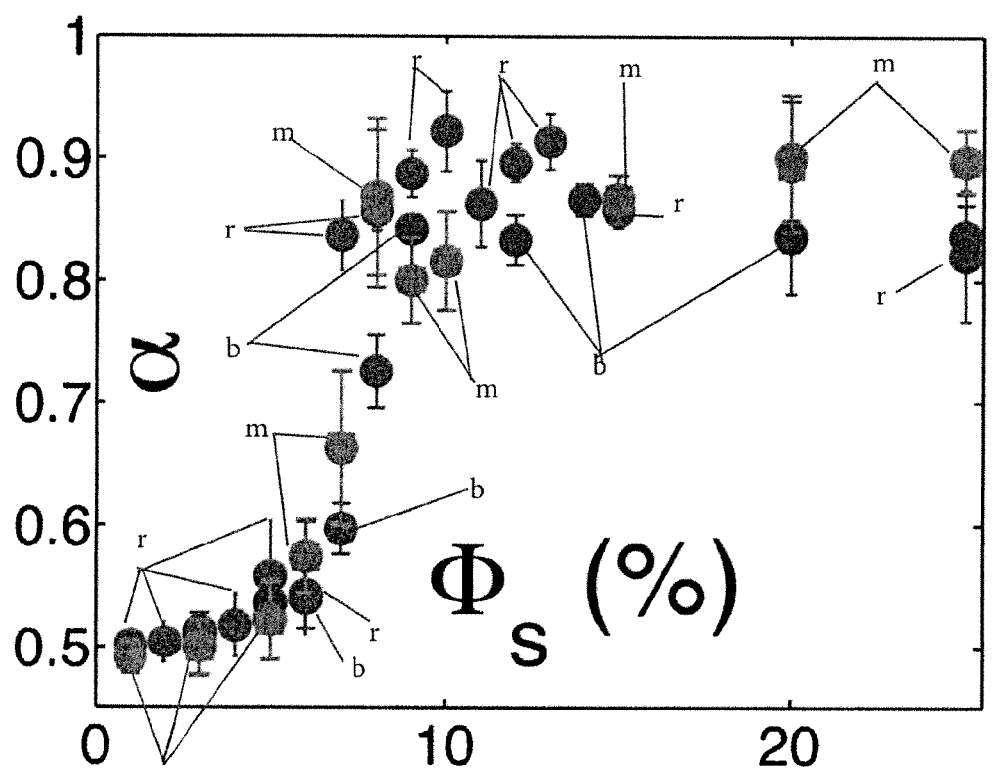
FIG. 4C illustrates scaling a of the number fluctuations for N=1000 (blue or "b" symbols), N=600 (red or "r") and N=400 (magenta or "m") particles in the simulations. For N=400, the curve after 50 $T_p$ (square) collapses with 35 Tp (circles) showing that the scaling is steady.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present application relates to a form of self-assembly from non-equilibrium driving forces from a suspension of synthetic photo-activated colloidal particles. Such forces lead to two dimensional "living crystals" which form, break, explode and reform elsewhere. In one implementation, the dynamic assembly results from a competition between self-propulsion of particles and an attractive interaction induced respectively by osmotic and phoretic effects and triggered by light. A transition from normal to giant fluctuations of numbers is observed, qualitatively and quantitatively described by simple numerical simulations. It has been shown that the existence of the living crystals is intrinsically related to the out-of-equilibrium collisions of the self-propelled particles.

It has been observed that collective phenomena associated with self-propelled particles lead to crystals. As a result of non-equilibrium driving forces, the crystals form, grow, collide, anneal, repair themselves and spontaneously self-destruct. The dynamic assembly results from a competition between self-propulsion of particles and an attractive interaction induced respectively by osmotic and phoretic effects. In one embodiment, the application of an external magnetic field can furthermore stabilize and steer the crystals. One implementation utilizes a self-propelled particle consisting of a photocatalytic and magnetic hematite cube, iron(III) oxide, partially protruding from a polymer sphere and immersed in a dilute $H_2O_2$ solution. Under blue light illumination the catalyzed decomposition of $H_2O_2$ sets up concentration gradients activating particle motion and interaction. Switching off the light stops the system from all but thermal diffusion.

In one implementation, a system consists of an active bimaterial colloid. A polymer sphere, 3-methacryloxypropyl trimethoxysilane (TPM), encapsulates most of a canted anti-ferromagnetic hematite cube, but with part exposed to the solvent, as show in FIG. 1A. The particles are immersed in a basic solution (pH~8:5) containing hydrogen peroxide (0.1 to 3% w/w), 5 mM tetramethylammonium hydroxide and 3:4 mM sodium dodecyl sulfate. In one embodiment, the particle is light activated so that the motion can be turned on and off optically. This switch provides rapid control of particle propulsion and a convenient means to distinguish non-equilibrium activity from thermal Brownian motion. Under normal bright field illumination, the colloids are at equilibrium with the solvent and thus sediment toward the bottom glass surface of the observation cell. When illuminated through the microscope objective with blue-violet light ($\lambda$ 430-490 nm) the particles exhibit self-propulsion. The motion, with a velocity up to 15 µm/s, only takes place at the cell surface, whether it is the bottom, the vertical side walls or the cell top. Individual particles undergo a random walk with a persistence length determined by the reorientation time $T_r=8.0\pm1.5$ s consistent with Stokes-Einstein rotational diffusion.

In equilibrium, with no blue light, the particles diffuse and are disordered, as shown in the inset of FIG. 1B. At surface area fractions $\Phi_s \gtrsim 7\%$ cooperative behavior of the light-activated colloids begins to emerge. Crystallites start to form in the sample 25 s after the light is turned on. An image of the crystals after 350 s is shown in the main panel in FIG. 1B. Immediately after the light is extinguished, the crystallites begin "dissolving" due to thermal diffusion (FIG. 1C); after 100 s there is no trace of the crystals (FIG. 1C insert). While the particles form organized crystallite structures under illumination, those structures are not static. As shown in FIG. 1D-G, the crystallites actively translate and rotate, collide, join, and split, as shown in FIG. 1D-G. These "living crystals" reach a dynamic steady state of creation and self-destruction. They do not grow to incorporate all available particles as would be the case for an equilibrium system with attractive interactions. An average cluster size of ~35 particles was measured, which does not seem to depend on the surface coverage fraction, $\Phi_s>10\%$. The lifetime of the crystals is finite and broadly distributed. The typical time for a cluster to change its size by 50% is 100±75 s. Fluctuations in the local number N of particles follows a power law $\Delta N \sim N^\alpha$. There is a transition at $\Phi_s \sim 7\%$ from normal $\alpha=\frac{1}{2}$ to giant fluctuations $\alpha \sim 0.9$, in line with recent predictions for disordered clusters in a system of polar isotropic active particles and observed in a granular system.

On implementation of the present invention relates to self-assembly from non-equilibrium driving forces leading to "living crystals" with a complex dynamics. For one embodiment, the essential components are active particles that "slow down" when they encounter one another, and a small but important attraction. The driven motion and steric and hydrodynamic hindrances lead to the formation of dynamic aggregates which form and dissolve. The introduction of a small attractive interaction, in this case arising from phoresis, orders the aggregates into periodic crystals at low surface fraction. The dynamics results from a competition between an active random motion and an attractive interaction of common origin: phoretic and osmotic effects which in our system can conveniently be switched on and off by light. The use of active particles and nonequilibrium forces for directed self-assembly opens a new area for design and production of novel and moving structures. The fact that they can be turned on and off with visible light adds control to this system as does the ability to use external magnetic steering.

Although the examples described below utilize a particular chemical environment, the scope of the present invention is not limited to such. For example, the SDS (surfactant) can be removed. In a further embodiment, TMAH can be replaced by sodium hydroxide or another component that fixes the pH around 8.5 (makes the catalytic reaction easier)

Hematite was selected a component for the examples in part because it is a good candidate for photovoltaic applications because it has a bandgap in the visible (harvest more energy than usual semi-conductors with gap in UV). In alternative embodiments, other materials may be used to create a particle that allows for controllable propulsion. For example, composite particles constructed of two or more semiconductive materials, such as hematite or $TiO_2$, can self propel and enable advantageous methods of assembly and manipulation. One can, for example, use the active hematite component to dock and cargo colloidal particles. Even bare hematite is mobile and can be steered with a magnetic field and activated by light. The attraction feature can be used to dock and unload cargos, which can be another use of the method of the invention.

In the examples below, the medium in which the particles reside includes $H_2O_2$ in basic medium. This environment clearly enhances the catalytic properties of the hematite. It is believed the $H_2O_2$ could be an electron scavenger. In one embodiment, electrodes or solar panels are put in such a medium to strongly increase the efficiency of such solar panels.

In the example described below, the particles of hematite are cubic and disposed partially in a polymer sphere. In an alternative embodiment, the hematite may be of various shapes such as ellipses or peanuts particles, which are also active under light. Further, the polymer may comprise a shape other than spherical while still enabling a non-equilibrium force to arise.

In one alternative embodiment, the hematite is able to self-assembly without a polymer. However, in this case, the particles do not form the "living crystals": because of their magnetic interaction, the particles form aggregates which does not get dissolved by Brownian motion once the light is off. The bare hematite, i.e. without the polymer, may having various shapes including cubes, peanuts and ellipses.

In one implementation, the present invention relates to cargo transportation with the particles (carriers) self-propelled with light and steered with a magnetic field. Once near a big colloid, the phoretic attraction loads it to the carrier and the system forms a colloidal cargo which may be transported by the carrier particles and is released by extinction of the light.

In a further embodiment, the cargo is located on a patterned surface, such as a replica of a CD master, for example, with stripes which are 100 nm high and 500 nm wide). The particles only self propel along the lines. Thus, in this embodiment, the particles follow a predefined pathway without steering them with a magnetic field.

The following non-limiting Example illustrates various aspects of the invention.

EXAMPLE I

Persistent Walking of Active Colloids

Figure 5:
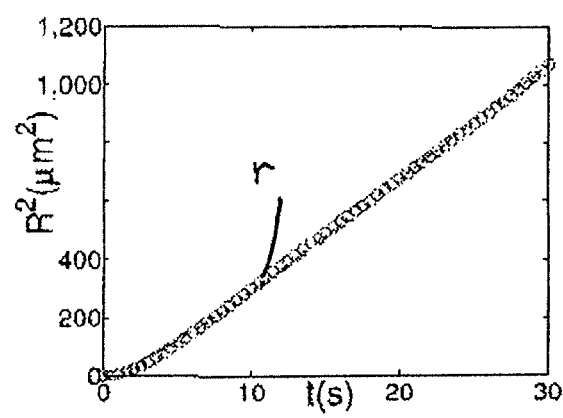
FIG. 5 illustrates a persistent random walk.

FIG. 5 illustrates a persistent random walk. The dynamics of individual active colloids is investigated measuring the two-dimensional (x,y) motion of the colloids with a camera (Lumenera Infinity X) at a frame-rate between 1 and 50 Hz. The trajectories are then extracted (see above). The mean square displacement of the colloids is obtained as $\Delta L^2 (\Delta t) = \langle (\vec{R}(t+\Delta t) - \vec{R}(t)) \rangle$ where $\vec{R}(t)$ is the (2D) instantaneous colloid position and the average is performed over time for each individual trajectory and then over an ensemble of trajectories (typically 15). For the activated colloids, the mean square displacement differs drastically from the equilibrium diffusive dynamics. The colloid exhibits ballistic motion at short times, $\Delta L^2(t) \sim V^2 t^2$, while at longer times a diffusive regime, $\Delta L^2(t) \sim 4D_{eff} t$, is recovered with an effective diffusion coefficient $D_{eff}$ much larger than the equilibrium coefficient $D_0$. As discussed in (10, 11), the active colloids are expected to perform a persistent random walk, due to a competition between ballistic motion under the locomotive power (with a constant swimming velocity V), and angular randomization due to thermal rotational Brownian motion. The transition between the two regimes occurs at the rotational diffusion time $\tau_r$ of the colloids. The characteristic ballistic length scale is accordingly $a = V \times \tau_r$. For time scales long compared to $\tau_r$, the active colloids therefore perform a random walk with an effective diffusion $D_{eff} = D_0 + V^2 \tau_r / 4$. The full expression of the mean squared displacement at any time is obtained as (10, 11):

$$\Delta L^2(\Delta t) = 4D_0 \Delta t + \frac{V^2 \tau_r^2}{2} \left[ \frac{2\Delta t}{\tau_r} + e^{\frac{-2\Delta t}{\tau_r}} - 1 \right]$$

In FIG. 5, the experimental points are fitted by the above formula of the persistent random walk with $\tau_r = 6:5$ s and the velocity V as the only fitting parameter. In this example V~3 µm/s.

EXAMPLE II

To understand the mechanisms involved in the self-propulsion and crystallization a series of experiments were on the separate components of the composite colloid, the hematite cube and the polymer sphere. First, a hematite cube was attached to a glass substrate and immerse it in a solution of surfactants, buffer, and $H_2O_2$. Adding 1.5 µm diameter colloidal tracer particles of polystyrene, silica, or TPM, the tracers are observed to diffuse randomly under normal bright field illumination. When illuminated with blue light, however, the tracers all move towards the immobilized hematite cube, converging on it from all directions, as indicated by the cartoon in FIG. 2A. This observation rules out advection, as adjective fluid flow must have zero divergence. When the light is on, the hematite generates a gradient that phoretically attracts the colloidal particles. The colloid come from every direction in space, which rules out hydrodynamic flow as the mechanism for attraction. When the light is off, the attraction vanishes and the hematite releases the colloids with diffuse thermally in the solution.

Therefore, the motion of the colloids towards the hematite particle must be caused by a phoretic motion induced by some gradient generated by the cube. Under blue light illumination, hematite catalyses the exothermic chemical decomposition of $H_2O_2$ creating thermal and chemical ($H_2O_2$ and $O_2$) gradients. Heating studies of the system suggest that diffusiophoresis is more important than thermophoresis in our system. The motion of the tracers towards the cube can be quantified by monitoring their position vs. time and calculating their velocity as a function of distance from the particle (FIG. 2B(1)). The dashed line through the data is a fit to $A/r^2$ consistent with a diffusive concentration profile $C \propto C_\infty (1 - B/r)$.

Phoresis and osmosis are complementary interfacial phenomena: in a gradient, a free colloid will exhibit a phoretic migration while a fixed surface of the same material will exhibit an osmotic flow at its surface in the opposite direction. Therefore a particle phoresing to the right has an osmotic flow at its surface to the left. Just as a silica colloid is attracted to a hematite cube, a free hematite particle is attracted to a stationary silica surface. Therefore, free cubes are added to a sample cell, the silica surface of the cover slip attracts the cubes. Indeed, hematite cubes are observed to be quickly drawn to the glass substrate as soon as blue light is turned on.

Surprisingly, once on the glass substrate, the hematite cubes continue to move on the glass surface when illuminated with blue light. Naïvely, one might expect the cubes to remain stationary, as the osmotic flow on the cover slip surface is away from the cube and ideally should be symmetric. However, the symmetry is broken either by imperfections on the cube or spontaneously by an instability where the motion of the cube induces different gradients fore and aft. Thus, in a solution of free hematite cubes attraction of the cubes to the surface is observed followed by self propulsion of the cubes surfing on the substrate when the light is turned on.

When using a suspension of composite particles, a hematite cube in a TPM sphere, a similar scenario was observed. When illuminated with blue light, the composite particle reorients so that the exposed hematite sits on the glass substrate, as shown in FIG. 2C (insets), and then begins to move at speeds comparable to the hematite alone. FIG. 2C shows the trajectory of a single composite particle, with the light turned on then off, while the insert shows a superposition of many trajectories with their origins aligned. The self-propelled motions are isotropic and diffusive with a persistence length (15-100 µm) determined by the rotational diffusion time and the velocity of the particle. The velocity of the particles depends weakly on the $H_2O_2$ concentration but strongly on the light intensity and the Debye screening length. In FIG. 2D the velocity vs. light intensity P follows Michaelis-Menten law behavior characteristic of a catalytic reaction. FIG. 2E suggests that the composite particle velocity asymptotes to a quadratic behavior with Debye length $\lambda_D$, a behavior expected from osmotic effects within a Debye length of a surface where the driving force $\alpha \lambda_D$ and the drag force is $\alpha$ velocity/$\lambda_D$.

Synthesis of the Active Colloids

Hematite ($\alpha$ $Fe_2O_3$) cubic colloids were prepared following the method described in the well-known prior art. Briefly a ferric hydroxide gel was prepared by mixing 100 mL of aqueous NaOH (6M) with 100 mL of $FeCl_3 \times 6H_2O$ (2M) and aged in a sealed Pyrex bottle at 100° C. After 8 days the gel changed into a thick reddish sediment which was repeatedly washed in deionized water to reveal the colloidal cubes. From electron microscopy pictures, an average particle size of 600 nm was measured with a typical polydispersity of 3%. To embed the hematite cubes into larger spherical particles 25 µL of $NH_3$ 28% was added to a 30 mL aqueous suspension of hematite particles ($\approx$2% wt) followed by 100 µL of 3-methacryloxypropyl trimethoxysilane (TPM, $\geq$98% from Sigma-Aldrich). The reaction mixture was kept under vigorous stirring and sampled every 15 minutes to monitor the particles' growth. The reactor was fed with more TPM (100 µL of TPM for each addition) at intervals of approximately 1 h until the particles reached the desired size. Finally 0.5 mg of 2,2'-azo-bis-isobutyrylnitrile (AIBN, Sigma-Aldrich) were added and the mixture heated to 80° C. for 3 h to harden the particles. After the synthesis the particles were cleaned and separated from secondary nucleation by sedimentation and were finally resuspended in deionized water. The surface zeta potential in water at a pH of 9 was measured to be −70 mV.

Preparation of the Buffer Solution with Hydrogen Peroxide

An aqueous solution is prepared with DI water (resistivity 18.2 MΩ, MilliQ) and contains 3:4 mM Sodium Dodecyl Surlfate (SDS, Sigma-Aldrich), 5 mM Tetramethylammonium hydroxide (TMAH, Sigma-Aldrich) and 3% w/w hydrogen peroxide (Sigma-Aldrich). The TMAH imposes the pH of the solution to pH~8:5 (AB15, Fischer Scientific) for which the bi-material colloids are charge-stabilized. These experimental conditions are an optimal compromise for colloids activity and stability.

Preparation of the Solution of Colloids

After synthesis, the suspension of colloids is washed and resuspended in a 4 mM sodium dodecyl sulfate (SDS) solution and stored. Prior to the experiment, a fresh solution of buffer with $H_2O_2$ is prepared. A sample contains typically 1 µl of bi-material colloids into 75 µl of fuel solution. It is strongly vortexed before use. A borosilicate capillary (Vitrotubes, 100 µm×2 mm) plasma-cleaned was filled with the solution and seal it with capillary wax (Hampton Research). The sample is then attached to a glass slide (thickness, 1 mm) and ready for observation under the microscope.

EXAMPLE III

Experimental Setup

All the observations are performed on an inverted microscope (Nikon) with oil immersion, high numerical apertures objectives (60×, N.A.=1.4 and 100×, N.A.=1.4). A fluorescent metalhalide lamp (Nikon Intensilight) is filtered with a bandpass filter (Semrock, FF01-460/60-25) resulting in a light with wavelengths $\lambda$ ~430-490 nm, blue-purple. The lamp is equipped with a manual shutter and ND filters to adjust the intensity of the light from $P_0$ to $P_0/32$ by multiples steps of ½. The total power of the blue-purple light is measured with a photo detector (Nova, Ophir) $P_0$=140±5 mW. The typical duration of an experiment is 10 to 30 mins, after which bubble formation limits further measurement. Images are acquired with a monochrome camera (Lumenera, Infinity X-32) with an acquisition rate in the range 0:1 to 40 Hz.

Image and data analysis are performed on a conventional, well known Matlab using known routines. One embodiment utilizes particle tracking using circular shape recognition of the particles and an a
adaptation of the tracking routine by Crocker et al.

EXAMPLE IV

Number Fluctuations

In order to determine the number fluctuations, the position of all the particles is first track on a frame i. The image contains $N_0$ particles. Then the frame is partitioned into M small subsystems of equal size L, L ranging from 0.1D to 40D (D being the diameter of the particles). Given a collection of subsystems of a given size L, the fluctuations of numbers are measured for an averaged value of particles $N_0/M$ as the standard deviation $\Delta N$ of the number of particles contained in the M. This number is averaged on different frames. $\Delta N = f(N)$ can be plot and the scaling $\alpha$ of the number fluctuation $\Delta N = N^\alpha$ can be extracted.

The same procedure is used to extract the number fluctuations from the Matlab Simulations. $\alpha$ is checked to determine if it reaches a steady value and this is the value utilized in one embodiment.

EXAMPLE V

For a solution of composite particles activated by light, two effects have to be taken into account (i) the collisions of our self-propelled particles surfing on the osmotic flow they set-up and (ii) the phoretic attraction between the particles. In order to see if these effects explain the formation of living crystals, simulations were performed guided by the experimentally determined parameters.

Figure 4B:
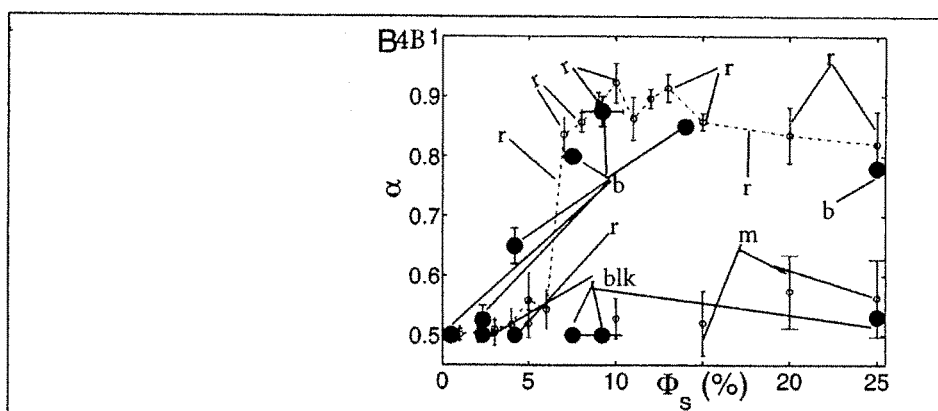
FIG. 4B illustrates scaling ➙ of the number fluctuations, $\Delta N \propto N^a$, for various surface coverage $\Phi_s$ measured in the experiment at equilibrium (black or "blk" symbols), under activation by the light (blue "or "b" symbols) and in the simulations with (A~=0: 87, red or "r" empty symbols) and without attraction (A~=0, magenta or "m" empty symbols). Normal fluctuations are observed, a=½, at equilibrium. The driven system exhibits a transition from normal fluctuations, a=½; to giant number fluctuations, a~0:9, at $\Phi_s$~7% in both the experiment and the simulations. The slight decay of the exponent observed in experiments and simulations is a finite size effect.
Figure 6A:
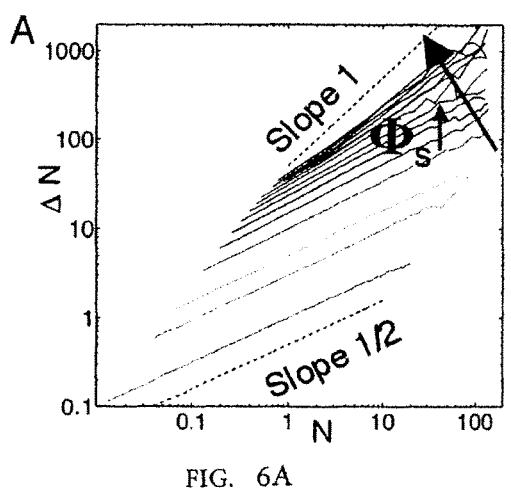
FIGS. 6A-B illustrate simulations without attraction.
Figure 6B:
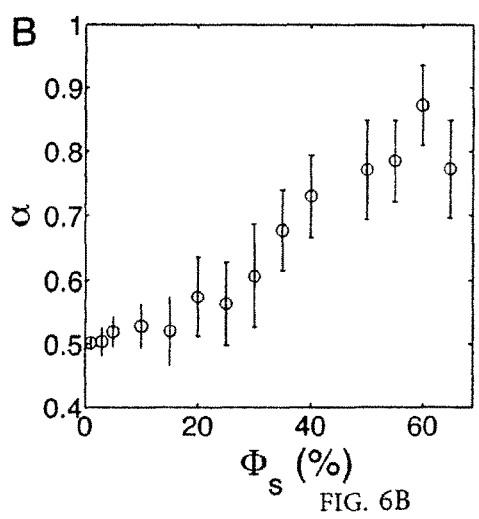

The simulations considered a minimal numerical model in which the self-propelled colloids are represented by self-propelled hard disks that move with a constant velocity in a direction that changes randomly on a time scale $T_r$, determined by rotational diffusion. The phoretic attraction between particles were modeled as a pairwise attraction between nearby particles consistent with the phoretic velocity shown as the red line in FIG. 2B. If a displacement makes two disks overlap, the particles are separated by moving each one half the overlap distance along their center-to center axis. Approximations were utilized to account for the effect of (hydrodynamic) lubrication forces in the crystals e.g. increase of the apparent viscosity and find little qualitative difference. FIG. 3 illustrates the results of simulations in which the attractive phoretic effects are taken into account. It reproduces the crystallite formation as well as the size and lifetime for the crystallites remarkably well under experimental conditions $\Phi_s$~3-20% and ~300-1500 particles. As shown on FIGS. 4A-B the simulations also capture the transition observed experimentally from normal to giant fluctuations of number, above a critical density $\Phi_s^c$ ~7%±1%. When the simulation turns off the pairwise phoretic attraction, large spatiotemporal fluctuations of density with normal number fluctuations, $\alpha$~0:5 (see FIG. 4B) are observed. The formation of clusters which grow and decay is recovered at much higher particle concentration, $\Phi_s \gtrsim$35-45% (see FIGS. 6A-B) which relate to simulations without attractions.

It is believed that active particles undergo diffusive motion with a large persistence length when not in "contact" but slow down, translate and diffuse more slowly, when they are in contact. This underlies the understanding of living crystals. The slowing down results from the inability of particles to penetrate their neighbors when encountered. Such density dependent diffusion can lead to giant fluctuations, clustering and phase separation in non-equilibrium systems, however at much larger surface density. The formation of non-crystalline clusters of active particles has been reported with bacteria coupled through short-range depletion interaction and janus particles with chemical attraction. The intermittent formation and breakage of the large crystals is always observed. This differs from the equilibrium nucleation and growth of a crystal of attractive colloids or the asymptotic formation of a single cluster from an assembly of self-propelled disks reported by Fily and Marchetti. Despite these observations, the effect of the finite number of activated particles in the experiment cannot be discarded.

Figures 4D, 4E, 4F, 4G, 4H, 4I:
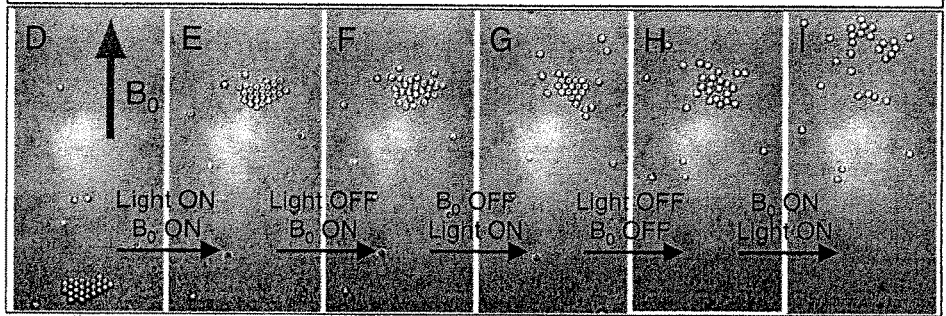
FIGS. 4D-I illustrate an investigation of the crystal mechanism. An external magnetic field $B_0$~1 mT was used to orient the particles and direct their motion. The red arrow is the orientation of $B_0$.

In order to investigate the underlying mechanisms, the magnetic properties of the embedded hematite cube can be utilized. Under an external magnetic field (B~1 mT), the alignment of the hematite slightly tilts the orientation of the particle and the self-propulsion proceeds in a direction parallel to the field, suppressing the rotational diffusion. The magnetic interactions with the Earth's magnetic field (~50 µT) and between the particles are negligible. FIGS. 4D-I illustrate two crucial aspects of this scenario regarding crystal breakup and formation. It is believed that crystal breakup depends on the velocity redirection by rotational diffusion of the particles in the crystal. If the direction of all the particles are aligned using an external magnetic field then the crystal will not break up. This is shown in FIGS. 4D-E. Suppression of the breakup in the magnetically steered crystal was observed. It is also believed that that collisions are required for crystal formation. In FIG. 4F the light is turned off and the crystal dissolves. With the magnetic field off, when the light is turned on, the particles collide and the crystal reforms, FIG. 4G. In FIG. 4H, the light is off and the crystal redissolves. In FIG. 4I, the magnetic field and light are on. The particles all move in the same direction, do not collide and there is no crystallization.

EXAMPLE VI

Numerical Simulation Parameters

The numerical simulations are run using Matlab. A numerical model is utilized in which the self-propelled colloids are represented by self-propelled hard disks that move with a constant velocity $V_0$ in a direction that changes randomly on a time scale $\tau_r$ governed by rotational diffusion. The rotational diffusion of the self-propelled disks is simulated through the addition of a random Gaussian noise to the propulsion angle. The amplitude of the noise controls the persistence time $\tau_r$. The phoretic attraction between the particles is modeled as a pairwise attractive interaction. For each time step $\Delta t$, the particle i undergoes a displacement $\Delta R$ as a consequence of its own self-propulsion and the attraction 20 by the neighbors $$j \neq i: \Delta R = V_0 \Delta t + \sum_{j \neq i} V_{att}(r_{i,j}) \Delta t,$$

with $r_{i,j}$ being the distance between particle i and j. The pairwise attraction is given by $V_{att}(r_{i,j}) \propto 1/r_{i,j}^2$, in agreement with the phoretic attraction measured experimentally. The hard-sphere repulsion between particles is event driven: if a displacement makes two particles overlap, they are separated by moving each one of them half of the overlap distance along their center-to-center axis.

Numerical Parameters

The problem is made dimensionless, and the values for the dimensionless parameters in the simulations are denoted by a tilde. The particle diameter D is used as unit of length, $\tilde{r} = r/D$. The unit of time is $\tau = D/V_0$ where $V_0$ is the velocity of the particle, $\tilde{t} = t/\tau$. As a consequence, the dimensionless velocity is unity: $\tilde{V}_0 = V_0 \tau/D = 1$. The parameters in the simulation are fixed in the following range, accordingly to the experimental value:

Diameter of the particles: $\tilde{D} = 1$
Rotational diffusion time: $\tilde{\tau}_r = \tau_r/\tau = 8$ to 50.
Pairwise attraction: $\tilde{V}_{att}(\tilde{r}) = \tilde{A}/\tilde{r}^2$.

The simulations run with N=1-1000 particles in a box with periodic boundary conditions with various surface fractions $\Phi_s$ of active particles. The time step for updating particle positions is $\Delta \tilde{t} = 1/200$, and particle-particle pairwise attractions are cut off for interparticle distances greater than 3.

EXAMPLE VII

A self-propelled colloidal hematite docker steered to a small particle cargo many times its size, docs and transports, the cargo to a remote location, and then releases it. The self-propulsion and docking are reversible and activated by visible light. The docker can be steered either by a weak uniform magnetic field or by nanoscale tracks in a textured substrate. The light-activated motion and docking originate from osmotic/phoretic particle transport in a concentration gradient of fuel, hydrogen peroxide, induced by the photocatalytic activity by the hematite. The docking mechanism is versatile and can be applied to various materials and shapes. The hematite dockers are simple single-component particles and are synthesized in bulk quantities. This system opens up new possibilities for designing complex micrometer-size factories as well as new biomimetic systems.

Controlled motion and transport of objects are basic functions that are simple to perform at the macroscale and indispensable for manufacturing and robotics. At the microscale, synthetic agents performing these tasks would be very useful for biomedical applications such as drug delivery, in situ assembly, delivery of microscopic devices, and for microfluidics. However, these tasks are difficult at small length scales where reversible and wireless actuation remain a significant challenge. This has fueled a significant effort to design populations of artificial microagents capable of moving autonomously in a controlled fashion while performing complex tasks.

One of the key requirements for building a microrobot is the ability of the system to harvest the free energy from its environment and convert it into mechanical work. The energy source can be provided by an electromagnetic field or by chemical fuels. Different routes and mechanisms have been explored for the latter: (i) jet propulsion of microtubular engines or (ii) self-phoretic particles. In the first case, the fuel is catalytically transformed into gas bubbles and expelled, propelling particles to ultrafast speeds, e.g. 350 body lengths/s. Self-phoretic propulsion relies on an interfacial phenomenon, phoresis, which leads to migration of a colloid in some kind of gradient. Self-electrophoresis was first used to propel bimetallic nanorods in hydrogen peroxide and has been broadly studied since. Alternatively, many realizations of microrobots are based on self-diffusiophoresis, the autonomous motion of a colloid in a chemical gradient produced by the anisotropic chemical activity of the particle. This route has been used to produce self-propelled Janus colloids in hydrogen peroxide and micromotors in diverse media and chemicals. The development of the micromotors has been carried out simultaneously with efforts to enrich their range of function, for example, for steering, fuel-free locomotion, light activation, cargo or for transport of cells, emulsion droplets, or colloids in a microfluidic environment, and for self-assembly and other collective effects. Other functionalities were recently realized with the development of self-propelled nanotools, which are useful for biomedical applications. More information about the mechanisms and experimental realizations can be found in recent reviews.

These self-propelled particles are obtained with various techniques including "rolled-up" technologies to obtain microtubes or vapor deposition on colloids, limited by the two dimension nature of the process. Moreover, their synthesis is generally complex, being composed of a number of iterative steps, at least one for each additional functionality. For example, one layer of magnetic material is required for direction control, another layer for docking, and a final layer of a chemically active material to provide propulsion. Here we present a novel type of particle made from hematite, a photocatalytic iron oxide. These particles are synthesized in very large quantities and provide all the desired functionalities: they self-propel, dock, and release particles with light actuation and can be externally steered by a weak magnetic field.

Our particles are made from hematite, a canted antiferromagnetic material with a permanent magnetic moment $\mu$. The particles are synthesized in bulk and can routinely be synthesized in 10 mL suspensions containing 20% v/v. Various shapes can be obtained: cubes, ellipses, or peanuts, in sizes ranging from tens of nanometers to a few micrometers. In this paper, we focus on the case of "peanut-shaped" hematite colloids, typically ~1.5 µm long and ~0.6 µm wide. The permanent magnetic moment $\mu$ is directed perpendicular to the long axis and can be deduced by direct optical observation. To improve the performance of the peanut particles as dockers, the hematite surface is partially etched using hydrochloric acid (HCl) solutions (usually 5 M). This creates particles with a rough surface that responds better to light than unetched particles. This effect is discussed later along with the propulsion mechanism. The particles can be observed with an optical microscope and are immersed in a basic solution (pH~8.5) containing hydrogen peroxide (1% w/w), 5 mM tetramethylammonium hydroxide (TMAH) in deionized water.

Figure 8A:
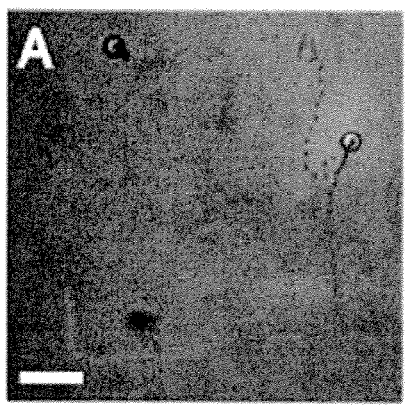
FIGS. 8A-8K show photoactivated colloidal dockers.

The colloids sediment under gravity and reside near the surface of a glass capillary. They are at equilibrium with the solvent and exhibit thermal Brownian motion. When illuminated through a microscope objective (100×, NA.=1.4) with blue light (Nikon Intensilight, filtered within $\lambda$~430-490 nm), the particles are attracted to the surface and start propelling along the surface. A weak uniform magnetic field B~1 mT can be externally applied to the sample using a Helmoltz coil. It fixes the orientation of the magnetic moment $\mu$, thus freezing the rotational diffusion of the peanut. Under light activation, the particle self-propels along the direction of B. Rotating the direction of the field induces a magnetic torque and a rapid change of direction in the self-propulsion, allowing one to steer the particles as shown in FIGS. 8C and 8D.

The mechanism of self-propulsion has been discussed in a previous well-known publication. Briefly, exposing the hematite peanuts to blue light induces the photocatalytic decomposition of the hydrogen peroxide in solution, $2H_2O_2 \rightarrow O_2 + 2H_2O$. This establishes chemical gradients in the vicinity of the peanut particles thus depleting $H_2O_2$ and creating an excess of $O_2$. In a chemical gradient, there is an unbalanced osmotic pressure in the interfacial layer near any nearby surface. The unbalanced osmotic pressure induces an interfacial diffusio-osmotic flow along the substrate, which initially propels the particle toward the substrate, in this case the capillary cell wall. Once against the wall, the gradient is in principle symmetric along the wall, and the particle should remain still. This is what we observe for most unetched peanut particles. After etching, however, about 80% of the peanuts start to self-propel along the substrate. We attribute this effect to the enhanced chemical anisotropy of the peanut surfaces after roughening. The peanut particles preferentially propel in a direction perpendicular to their long axis.

The illuminated hematite harvests free energy from the hydrogen peroxide fuel in solution generating an osmotic flow along the substrate. A consequence of this peculiar self propulsion mechanism is a sensitivity of the active particles to the physical properties of the substrate. This sensitivity can be harnessed to direct the particles along the nanometer-size tracks in a textured substrate.

Figure 7A:
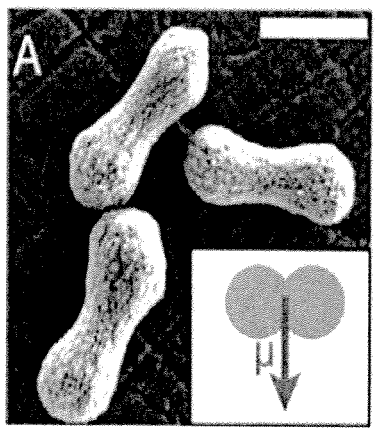
FIG. 7A shows an SEM picture of the hematite peanut particles. Scale bar is 1 μm. Inset shows the direction of the permanent magnetic moment μ of the particle, perpendicular to the long axis. 7B shows Schematic of docking. Under activation by an external blue light and steering by a magnetic field, a hematite particle docks with a passive sphere and transports it. This scenario is reversible: when the light is turned off, the hematite particles release the cargo and diffuse away.
Figure 7B:
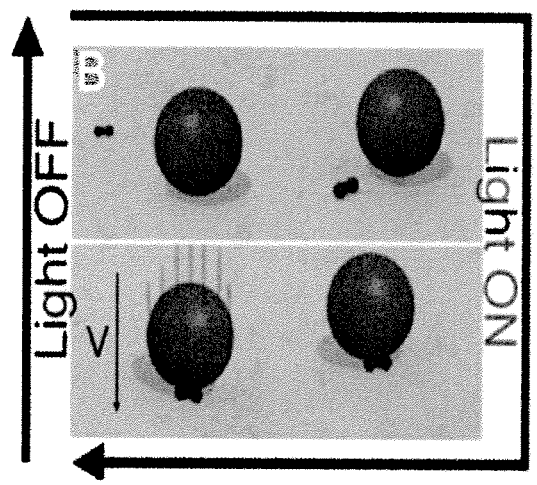

The chemical gradients surrounding the activated hematite induce diffusiophoresis of surrounding colloids in the solution. For solutions containing TMAH (pH~8.5), we observe negative phoresis (attraction of a sphere toward the hematite particle) for all materials tested: silica, polystyrene, and 3-methacryloxypropyl trimethoxysilane (TPM). Alternatively, lowering the pH to 6.5, suppressing the TMAH from the solution, we observe positive diffusiophoresis: spheres are repelled from the hematite particle. In the following, we exploit only the ability to attract colloidal spheres to the hematite and hence consider only basic solutions (pH~8.5) containing TMAH. We use this property to dock the hematite particles to larger colloids and to carry them as cargo, as sketched in FIG. 7B and documented in FIG. 8A.

First we activate the particles with light. Using a weak uniform external magnetic field B~1 mT, we then direct the peanut particle to the vicinity of a large colloid. The hematite particle phoretically attracts the large colloid and docks on its surface (see FIG. 8E). The composite hematite peanut/colloid system forms an asymmetric particle with a localized chemically active site, the hematite peanut, and a passive part, the sphere. The system propels as a whole, with the active hematite peanut leading (see FIGS. 8F and 8G). The direction of the cargo is fixed with the external magnetic field using the hematite particle to steer. Turning the light off, the chemical activity of the hematite ceases and the chemical concentration gradients vanish by diffusion in a few tens of milliseconds. In the absence of gradients, the osmotic motion and phoretic attraction cease as the system returns to equilibrium. As the peanut particles stop, the colloidal cargo is released and diffuses away (see FIGS. 8J and 8K).

The docking mechanism is reversible: attraction and propulsion immediately restart once the light is turned on. Consequently, a hematite particle can carry, dock, and release many cargos and, for example, play the role of a microscopic shepherd gathering colloidal particles. The effect is versatile; we can load any particle exhibiting negative diffusion phoresis, in our case silica, polystyrene, and TPM for diameters ranging from 1 to 20 µm.

While the velocity of isolated hematite particles is widely distributed, the velocities of composite hematite/cargo pairs are all the same for a given cargo size. In this case, the chemical gradient propelling a composite hematite/cargo pair is determined by the geometrical anisotropy of the pair, not by the chemical anisotropy of the etched lone carrier. Indeed, once docked, even previously immobile unetched hematite particles start propelling.

Figure 8B:
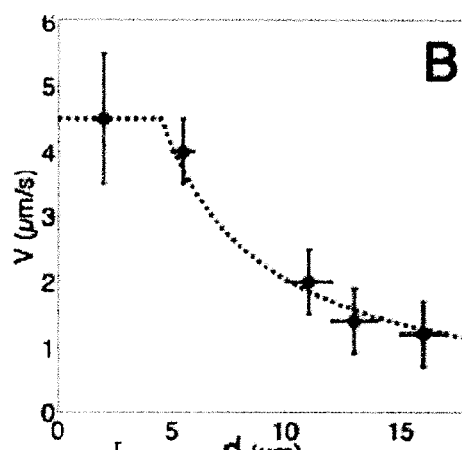
Figure 8C:
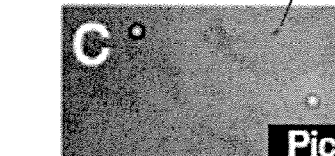
Figure 8D:
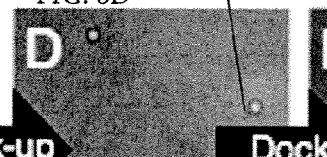
Figure 8E:
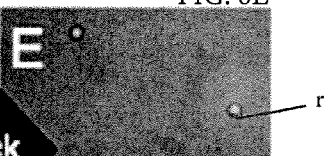
Figure 8H:
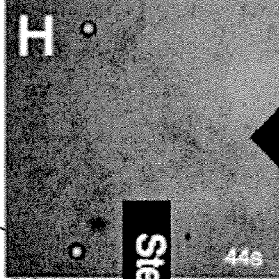
Figure 8G:
Figure 8F:
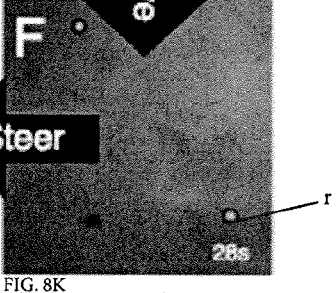
Figure 8I:
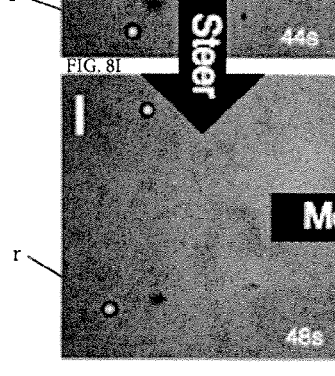
Figure 8J:
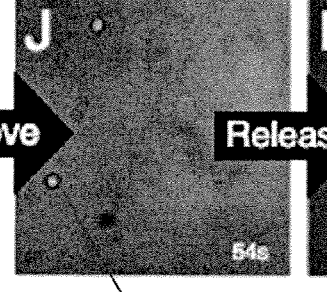
Figure 8K:
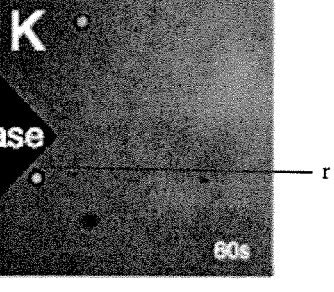

We measure the velocity of the composite hematite/colloid system while varying the diameter d of the cargo (see FIG. 8B). For cargos significantly larger than the hematite carrier (d>5 μm), the transport velocity V scales inversely with the cargo diameter, V α1/d, consistent with a constant pulling force exerted by the hematite particle and a Stokes drag proportional to d. For cargos comparable in size to the hematite carrier, the velocity saturates.

The cargo scenario is readily adapted to other hematite particle shapes. We can dock colloidal particles using hematite cubes, with the minor disadvantage that the direction of the magnetic moment, which is along the body diagonal of the cube, is not apparent by optical observation.

The interfacial origin of the propulsion mechanism makes the particles sensitive to chemical or physical alterations of the substrate. As a demonstration, we prepared a textured substrate of parallel stripes obtained by making a polydimethylsiloxane (PDMS) replica of a compact disk (CD). The pattern consists of stripes that are 0.6 μm wide, 110 nm deep, and separated by 1.2 μm grooves (see FIG. 9A). The PDMS replica exhibits visible channels (see FIGS. 9B and 9C-9F). Before the light is turned on, the hematite and a 0.5 μm TPM sphere diffuse near the substrate surface, unaffected by the shallow pattern. After the light is turned on, the hematite aligns along a channel and phoretically attracts the TPM sphere (see FIG. 9C). The loading of the colloid breaks the symmetry and propels the cargo along the lines of the pattern (see FIGS. 9E and 9F) showing that the hematite particles can be driven along a predetermined pathway using physical alteration of the landscape. The same effect is observed on a cleaved mica surface where the hematite particles self-propel along a nanocrack in the material. In both cases, the cargo is released by turning off the light.

We have introduced a scheme for making microrobots, synthesized in bulk, possessing the ability to be activated by light, and steered by a magnetic field. They can load, transport, and unload colloids made from many different materials, with sizes up to 20 μm, many times the size of the microrobots. These capabilities open up new opportunities for engineering at the microscale and for micro-manufacturing. We demonstrate their ability to act as a colloidal shepherd to pick up and gather spheres. This is a step forward in making a large scale microscopic factory. Moreover, the ability to autonomously carry the cargo along a predetermined pathway drawn on a textured substrate is unique and a direct translation of ground rail transportation to the microscale. In this sense, the system acts similarly to molecular motors such as myosin, which walk along one-dimensional actin filaments. The interaction between myosin and actin is at the core of transport in cells, cell division, or muscle contraction. The ability to produce synthetic systems inspired by motor proteins such as myosin opens up new possibilities for complex biomimetic systems such as microscopic artificial muscles.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of controlling structure formation of a plurality of particles to achieve reconfigured structures having a desired selectable property, comprising:
   applying a non-equilibrium driving force to a plurality of bimaterial colloids;
   inducing attractive interaction between each of the plurality of bimaterial colloids; and
   forming a structure comprised of a reconfigured plurality of bimaterial colloids having the desired selectable property.

2. The method of claim 1, wherein the structure is a living crystal.

3. The method of claim 1, wherein the non-equilibrium driving force is osmotic.

4. The method of claim 1, wherein the attractive interaction is phoretic.

5. The method as defined in claim 1 wherein at least one of the non-equilibrium driving force and the attractive interaction arise from a magnetic force or a photonic force.

6. The method as defined in claim 1 wherein the desired selectable property is selected from the group of a mechanical property, an electrical property, a chemical property and a photonic property.

7. The method as defined in claim 1 wherein the structure is reconfigured by healing defects in the structure.

8. A method of controlling structure formation of a plurality of particles to achieve reconfigured structures having a desired selectable property, comprising:
   applying a non-equilibrium driving force to a plurality of particles;
   inducing attractive interaction between each of the plurality of particles; and
   forming a living crystal structure comprised of a reconfigured plurality of particles having the desired selectable property.

9. The method of claim 8, wherein the non-equilibrium driving force is osmotic.

10. The method of claim 8, wherein the attractive interaction is phoretic.

11. The method as defined in claim 8 wherein at least one of the non-equilibrium driving force and the attractive interaction arise from a magnetic force or a photonic force.

12. The method as defined in claim 8 wherein the desired selectable property is selected from the group of a mechanical property, an electrical property, a chemical property and a photonic property.

13. A method of controlling structure formation of a plurality of particles to achieve reconfigured structures having a desired selectable property, comprising:
   applying a non-equilibrium driving force to a plurality of particles;
   inducing attractive interaction between each of the plurality of particles; and
   forming a structure reconfigured by healing defects and comprised of a reconfigured plurality of particles having the desired selectable property.

14. The method of claim 13, wherein the structure is a living crystal.

15. The method of claim 13, wherein the non-equilibrium driving force is osmotic.

16. The method of claim 13 wherein the attractive interaction is phoretic.

17. The method as defined in claim 13 wherein at least one of the non-equilibrium driving force and the attractive interaction arise from a magnetic force or a photonic force.

18. The method as defined in claim 13 wherein the desired selectable property is selected from the group of a mechanical property, an electrical property, a chemical property and a photonic property.

* * * * *